(12) United States Patent
Yurman et al.

(10) Patent No.: US 7,966,704 B2
(45) Date of Patent: Jun. 28, 2011

(54) CLASP FOR JEWELRY

(75) Inventors: David Yurman, New York, NY (US); John Berg, Fishkill, NY (US)

(73) Assignee: Yurman Studio Inc., New York, NY (US)

( * ) Notice: Subject to any disclaimer, the term of this patent is extended or adjusted under 35 U.S.C. 154(b) by 323 days.

(21) Appl. No.: 12/157,191

(22) Filed: Jun. 6, 2008

(65) Prior Publication Data
US 2009/0300892 A1 Dec. 10, 2009

(51) Int. Cl.
*A44B 19/00* (2006.01)
(52) U.S. Cl. .......................................... 24/598.1; 63/21
(58) Field of Classification Search ................ 24/598.1, 24/598.2, 598.3, 598.4, 601.6, 326, 343, 24/265 EC; 63/3.1, 21; 70/456 R, 459
See application file for complete search history.

(56) References Cited

U.S. PATENT DOCUMENTS

| | | | | |
|---|---|---|---|---|
| 652,249 | A * | 6/1900 | Crossman | 70/20 |
| 1,027,041 | A * | 5/1912 | Gammelgaard | 63/21 |
| 3,328,986 | A * | 7/1967 | Ralton | 70/456 R |
| 3,462,807 | A | 8/1969 | Marquardt | 24/230 |
| 4,419,874 | A * | 12/1983 | Brentini | 70/459 |
| 4,958,420 | A * | 9/1990 | Bunz | 24/653 |
| 4,984,442 | A * | 1/1991 | Benson | 70/456 R |
| 5,522,529 | A | 6/1996 | Yurman et al. | 224/176 |
| D371,314 | S | 7/1996 | Yurman | D11/3 |
| 5,653,009 | A * | 8/1997 | Kassardjian | 24/667 |
| 5,735,025 | A * | 4/1998 | Bailey | 24/600.1 |
| 6,145,171 | A | 11/2000 | Hoshino | 24/573.1 |
| 6,381,814 | B1 * | 5/2002 | Colpo | 24/611 |
| 6,408,493 | B1 | 6/2002 | Yurman et al. | 24/600.4 |
| 6,484,376 | B1 | 11/2002 | Khatchadourian et al. | 24/658 |
| D496,591 | S | 9/2004 | Yurman | D10/32 |
| D499,041 | S | 11/2004 | Yurman | D11/13 |
| 6,883,211 | B2 | 4/2005 | Hoshino | 24/663 |
| D508,417 | S | 8/2005 | Yurman | D10/32 |
| D523,370 | S | 6/2006 | Yurman | D11/26 |
| 7,082,651 | B2 | 8/2006 | Ninomiya | 24/658 |
| 2005/0188512 | A1 | 9/2005 | Ninomiya | 24/587.11 |

* cited by examiner

*Primary Examiner* — Robert J. Sandy
*Assistant Examiner* — Michael Lee
(74) *Attorney, Agent, or Firm* — Davidson, Davidson & Kappel LLC

(57) ABSTRACT

A clasp which is lockable in both an open and a closed position includes a body having a first opening, a second opening, and an internal space; a connector fixed to the body for linking to a chain; a first spring; and a moveable connector. The movable connector, inseparable from the body, is movable to a locked closed position by the first spring and movable to a locked open position by an external force. The movable connector includes a first latch piece within the internal space of the body, and extends through the first opening. A button extends through the second opening. The button includes a second spring and a second latch piece that interfaces with the first latch piece. In a first position of the button, the second latch piece locks with the first latch piece. In a second position of the button, the second latch piece and the first latch piece disengage and the movable connector can be moved by an external force allowing the second spring to move the second latch piece to a position that keeps the movable connector in the locked open position.

38 Claims, 7 Drawing Sheets

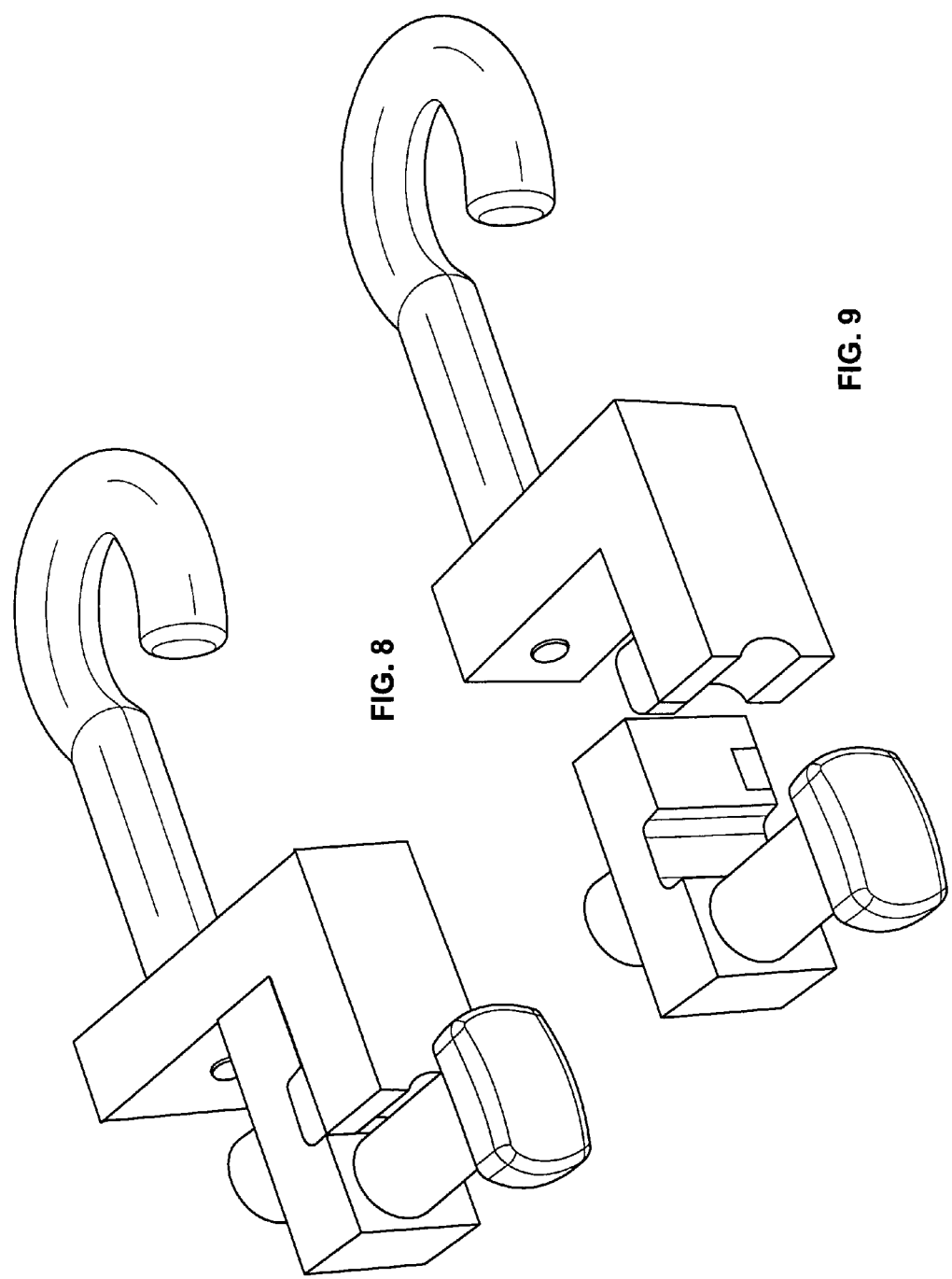

CLASP FOR JEWELRY

FIELD OF THE INVENTION

The present invention relates generally to clasps for jewelry.

BACKGROUND OF THE INVENTION

There are many commercially available clasps used today, particularly in the form of plugs, lobster claws or spring ring clasps. Generally, the plug clasp has a receptacle element attached to one end of a chain and a plug element attached to the opposite end of the chain, where the plug and receptacle elements connect together to close the chain. In the case of the lobster clasp or the spring ring clasp, a chain is connected to one end of a ring that can be opened and closed to receive a ring attached to the opposite end of the chain. These clasps are difficult to use because a person has to apply constant pressure to a very small lever or button to keep the clasp open. The dexterity needed to operate these types of clasps is rather high and often requires assistance to operate. Moreover, people with arthritis have increased difficulty operating these types of clasps while those with long fingernails have difficulty and often break fingernails while trying to operate these clasps.

SUMMARY OF THE INVENTION

In accordance with an embodiment of the invention, a clasp for jewelry includes a body having a first opening, a second opening, and an internal space. A connector is fixed to the body for linking to a chain. A movable connector, inseparable from the body, movable to a locked closed position by a first spring and movable to a locked open position by an external force, the movable connector extends through the first opening and includes a first latch piece within the internal space of the body. One or more guides in the internal space. A button extends through the second opening and is movable along the one or more guides, the button includes a second spring and a second latch piece that interfaces with the first latch piece, the button includes two positions, in a first position the second latch piece locks with the first latch piece, in a second position the second latch piece and the first latch piece disengage and the movable connector can be moved by an external force allowing the second spring to move the second latch piece to a position that keeps the movable connector in a locked open position.

In accordance with another embodiment of the invention, a clasp for jewelry includes a body having a first opening, a second opening, and an internal space. A connector fixed to the body for linking to a chain. A movable connector, inseparable from the body, movable to a locked closed position by a first spring and movable to a locked open position by an external force, the movable connector extends through the first opening and includes a first latch piece within the internal space of the body. One or more guides in the internal space. A button extends through the second opening and includes a second latch piece movable along the one or more guides that locks with the first latch piece in the locked closed position and in the locked open position, the second latch piece having a first position, a second position and a third position, the first position is held in the locked closed position by a second spring that forces the second latch piece to interface with the first latch piece, the second position causes the first and second latch pieces to disengage allowing the movable connector to be moved by the external force to the open position, and the third position, held by force from the second spring, causes the second latch piece and the first latch piece to engage resulting in the locked open position.

In another embodiment of the present invention, a clasp for jewelry includes a body having an internal space, a first opening and a second opening generally perpendicular to each other. A connector fixed to the body for linking to a chain. A movable connector, inseparable from the body, movable to a locked closed position by a first spring and movable to a locked open position by an external force, the movable connector extends through the first opening and includes a first piece within the internal space of the body, the first piece is L-shaped and includes a first latch. One or more guides in the internal space. A button extends through the second opening, the button including a second piece perpendicular to the button and including a second spring, the second piece interfaces with the one or more guides and includes a second latch for interfacing with the first latch, the button includes a first position and a second position held place by the second spring, in the first position the second latch interfaces with the first latch locking the movable connector in the closed position, and in the second position the second latch and the first latch disengage, allowing the movable connector to be moved by an external force to the open locked position.

In yet another embodiment of the present invention, a clasp for jewelry includes a body having an internal space, a first opening and a second opening generally perpendicular to each other. A connector fixed to the body for linking to a chain and a movable connector inseparable from the body extends through the first opening. An L-shaped piece connected to the movable connector located within the internal space of the body and including a first latch. A first spring between the L-shaped piece and an internal wall of the body, the first spring in a position to energize the movable connector and the L-shaped piece to a locked closed position and resist a locked open position. One or more guides in the internal space and a button extend through the second opening. A second piece that interfaces with the one or more guides and is connected to the button at a angle perpendicular to the button, the second piece includes a second latch for interfacing with the first latch when the movable connector is in the locked closed position. A second spring between the second piece and an internal wall of the body, the second spring positioned to energize the second piece in a direction to interface the second latch with the first latch in the locked closed position, and the second spring energizing the second piece further in the direction to connect an end of the second piece with the L-shaped piece in the locked open position.

BRIEF DESCRIPTION OF THE DRAWINGS

Further objects, features and advantages of the invention will become apparent from the following detailed description taken in conjunction with the accompanying drawings, in which:

FIG. 8 is a perspective view of a clasp showing bar 50 notched out in accordance with an embodiment of the invention; and FIG. 9 is another perspective view of a clasp showing bar 50 notched out in accordance with an embodiment of the invention.

DETAILED DESCRIPTION OF THE INVENTION

In accordance with the embodiments of the present invention, a clasp is described that is lockable in both an open and a closed position. In the locked open position the clasp can be manipulated without concern that the clasp may unintentionally close before it can receive the end of a chain, such as a necklace or the like. Of course, the chain can be any shape, size and material and can be worn anywhere on a person. Pushing a button on the clasp closes and locks the clasp. The clasp remains locked in the closed position until the button is pressed and the clasp is pulled open. This feature prevents the clasp from being unintentionally opened.

Figure 1:
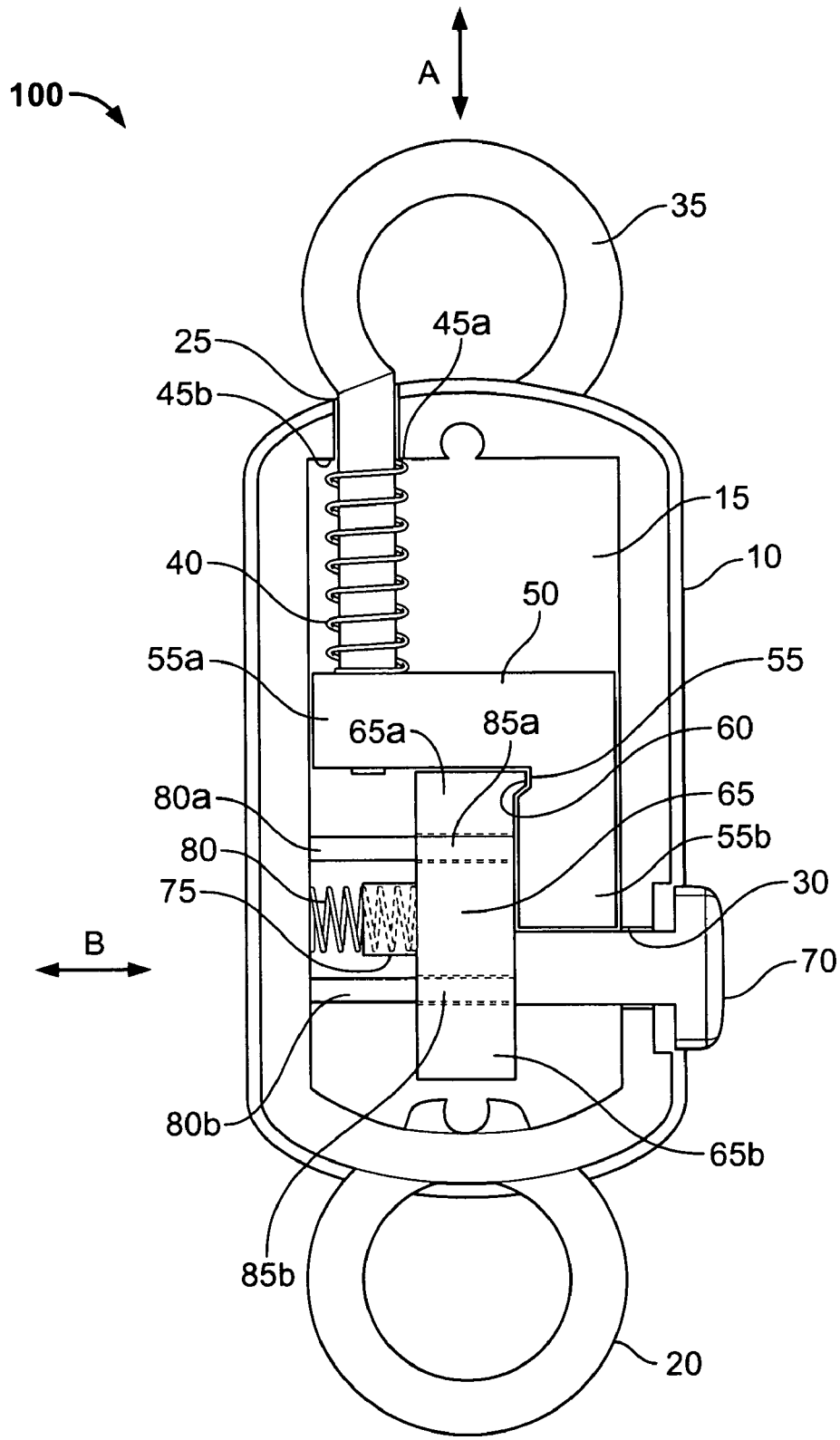
FIG. 1 is a cross-sectional view of a clasp in its locked closed position in accordance with an embodiment of the invention.
Figure 3:
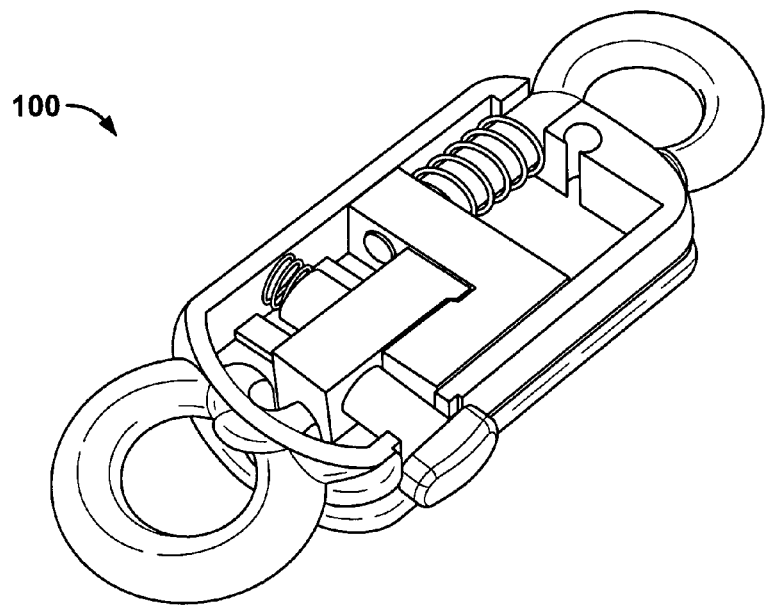
FIG. 3 is a perspective view of a clasp in its locked closed position in accordance with an embodiment of the invention.

FIG. 1 is a cross-sectional view of a clasp 100 illustrated in its locked closed position, in accordance with an embodiment of the present invention. FIG. 3 is a perspective view of clasp 100 in its locked closed position. Referring back to FIG. 1, clasp 100 shows a body 10 having an internal space 15. Body 10 houses components and parts of clasp 100 and internal space 15 provides an area or cavity for the components to sit and move, in accordance with an embodiment of the present invention. Body 10 and internal space 15 each can vary in shape and size. The outer surface of body 10 has a connector 20 through which a chain, such as necklace or the like, can be connected to body 10. In this example, connector 20 is a ring that is permanently closed. Body 10 also has two openings, an opening 25 and an opening 30.

One component of clasp 100 is a movable connector 35 through which a free end of a chain, such as a necklace or the like, can be hooked to movable connector 35 and ultimately connected to clasp 100. Movable connector 35 passes through opening 25 and can move back and forth (in the direction denoted by arrow A) within opening 25, resulting in the opening and closing of moveable connector 35. In its open position, movable connector 35 can receive a free end of the chain, and in its closed position can lock the free end of the chain to clasp 100. In this example, movable connector 35 is shaped like a hook, having a cylindrical body with a curved portion and a linear portion, but could have a different shape.

The linear portion of movable connector 35 has a diameter size allowing it move, within opening 25, in the direction denoted by arrow A. A coil spring 40 is disposed around the linear portion of movable connector 35. Coil spring 40 is used to energize movable connector 35, such as to provide automatic closing of movable connector 35, which is discussed in more detail below. Coil spring 40 has a diameter large enough to fit around the linear portion of movable connector 35. To prevent coil spring 40 from dropping out of body 10, its diameter is also large enough to be stopped by an inner portion of body 10, denoted by locations 45*a* and 45*b*. The inner body of body 10 can act as a stopper or a stopper(s) can be added. Locations 45*a* and 45*b* of the inner portion of body 10 acts as a resilient force against coil spring 40. Of course different size springs can be used, so along as its diameter is such that it fits around the linear portion of movable connector 35, fits within internal space 15, and wont drop out of, or when compressed, wont be forced out of body 10 through opening 25. This can be met by having a spring with a diameter greater than the diameter of opening 25. Moreover, stops may be located at 45*a* and 45*b* to act as a resilient force against coil spring 40 to prevent coil spring 40 from passing through opening 25. The stops can be projections standing on the inner surface of body 10 at locations 45*a* and 45*b*.

The end of the linear portion of movable connector 35 is connected to a bar 50. Bar 50 has a shape that is generalized as a bar that is turned approximately 90 degrees at a location around its midway point, having an arm 55*a* perpendicular to an arm 55*b*. In another example, it can be generalized as two bars attached to each at an angle of approximately 90 degrees and at one end of each bar. Bar 50 and the longitudinal portion of moveable hook 35 are connected to each other and are both moveable in the direction denoted by arrow A, within internal space 15 of body 10. When movable connector 35 is pulled open by an external force, the side of bar 50 that is connected to the end of longitudinal portion of movable connector 35 prevents moveable hook 35 from being pulled out of body 10. Movable connector 35 and bar 50 move together within internal space 15 as dictated by a force applied to movable connector 35 opposite to the resistance force provided by coil spring 40, causing movable connector 35 to lock in the closed position. Movable connector 35 and bar 50 can also move together in response to the expansion of coil spring 40, which is discussed in more detail below.

Located at the inside angle of bar 50 is a latch 55. In this example, latch 55 is a groove that spans the width of bar 50. Latch 55 interacts with a latch 60 to lock and unlock clasp 100, which is discussed in more detail below.

Separate from bar 50 and movable connector 35 is a bar 65 having ends 65*a* and 65*b*. Bar 65 is positioned generally perpendicular to arm 55*a* and generally parallel to arm 55*b* of bar 50. In addition, bar 65 is moveable in a direction, denoted by arrow B, which is generally perpendicular to the direction of the movement of bar 50 and movable connector 35. In the example, latch 60 is located at end 65*a* of bar 65 and can be positioned to directly interact, contact, and fit into latch 55 of arm 50. In this example, latch 60 is a protrusion spanning the width of bar 65 and having a general height and shape equal to the general depth and inverse shape of latch 55. Latch 60 and latch 55 act together to keep movable connector 35 locked when in the closed position. FIG. 1 shows latch 60 and latch 55 in a locked position, thus preventing movable connector 35 from moving.

A button 70 is connected to arm 65. Button 70 has a shaft that fits through opening 30 of body 10. The diameter of the shaft is such that button 70 can move within opening 30 in the direction denoted by arrow B. The shaft of button 70 extends into internal space 15 where the end of the shaft connects perpendicularly to end 65*a* of bar 65.

Figure 2:
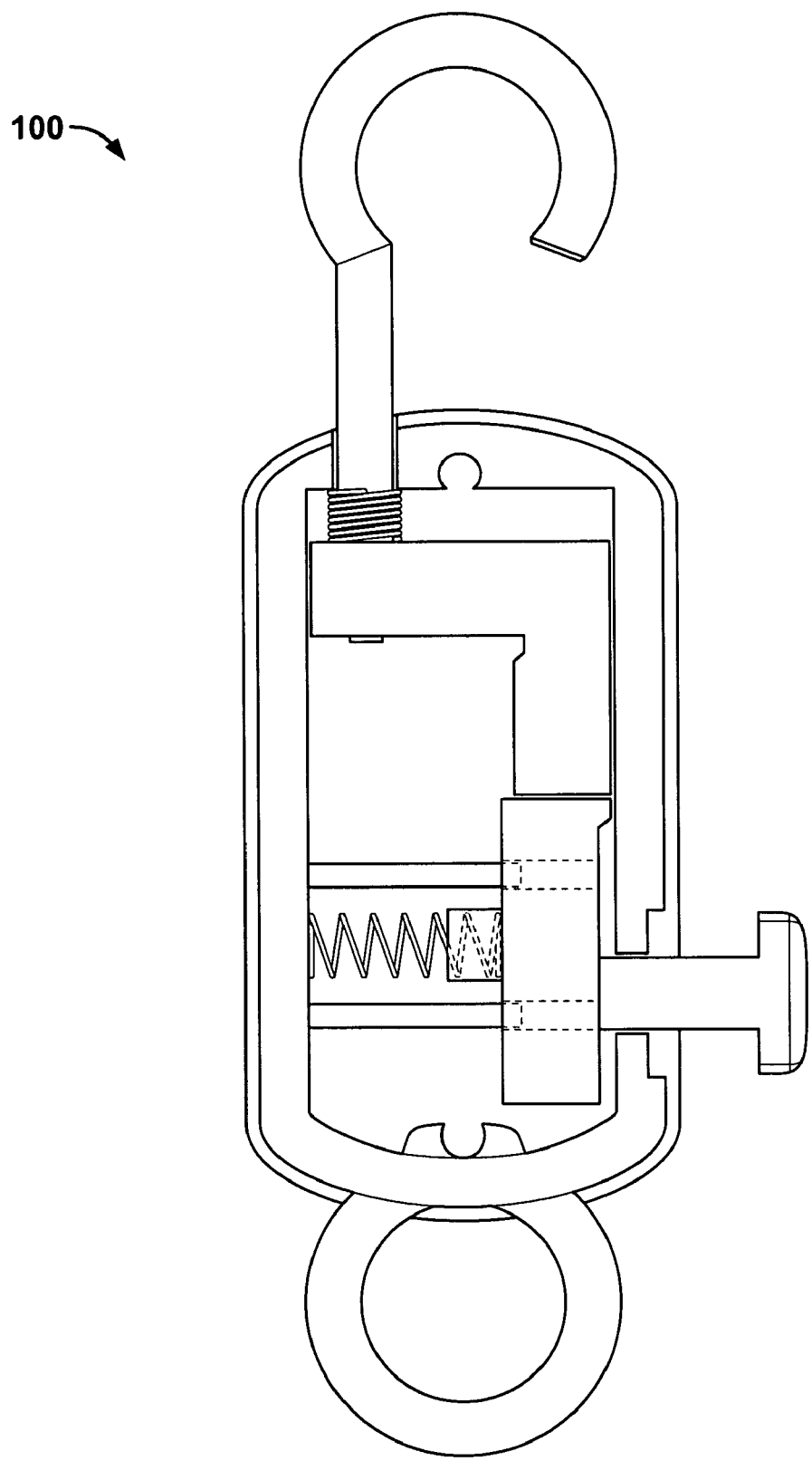
FIG. 2 is a cross-sectional view of a clasp in its locked open position in accordance with an embodiment of the invention.
Figure 4:
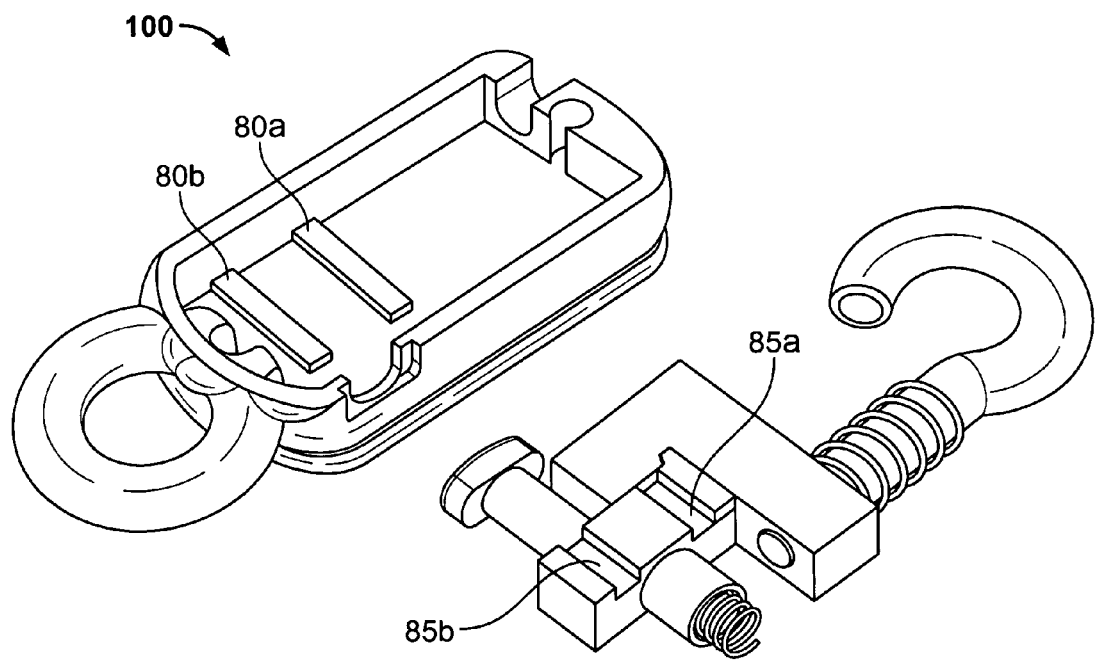
FIG. 4 is a perspective view of a clasp showing guides and its components removed from the clasp in accordance with an embodiment of the invention.
Figure 6:
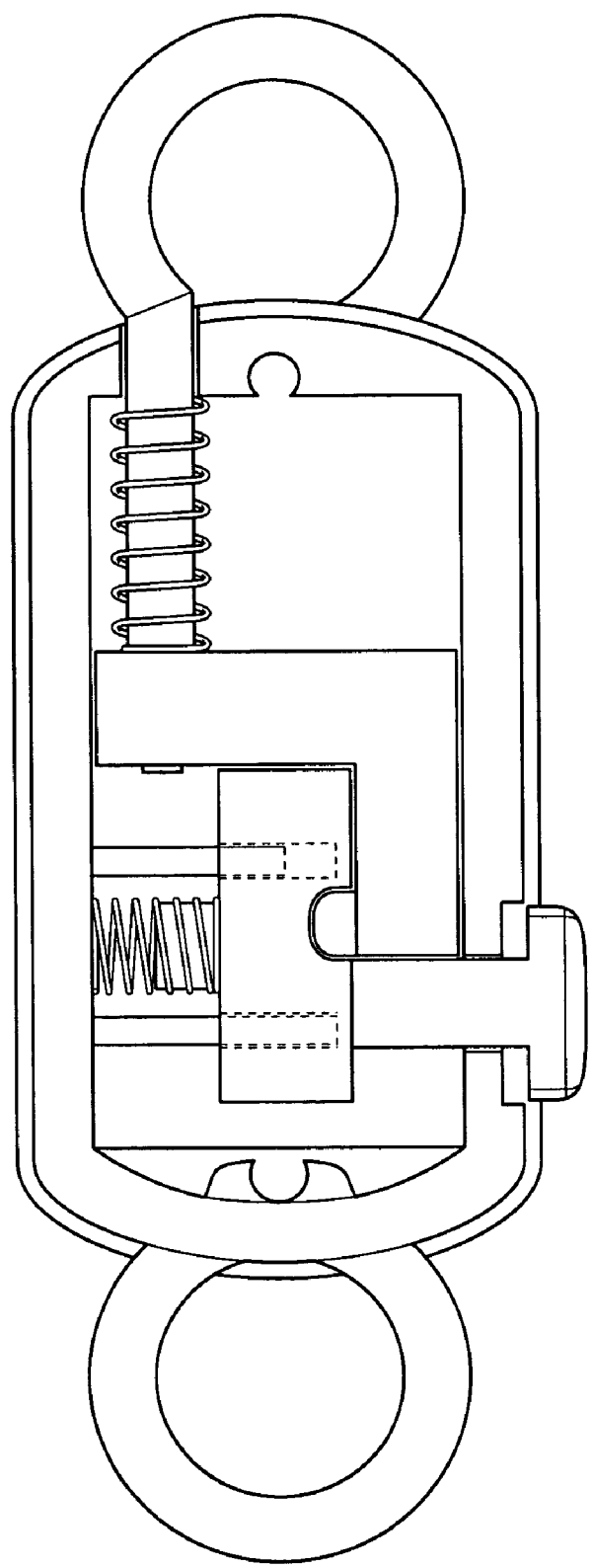
FIG. 6 is a cross-sectional view of a clasp in its locked closed position in accordance with an embodiment of the invention.
Figure 7:
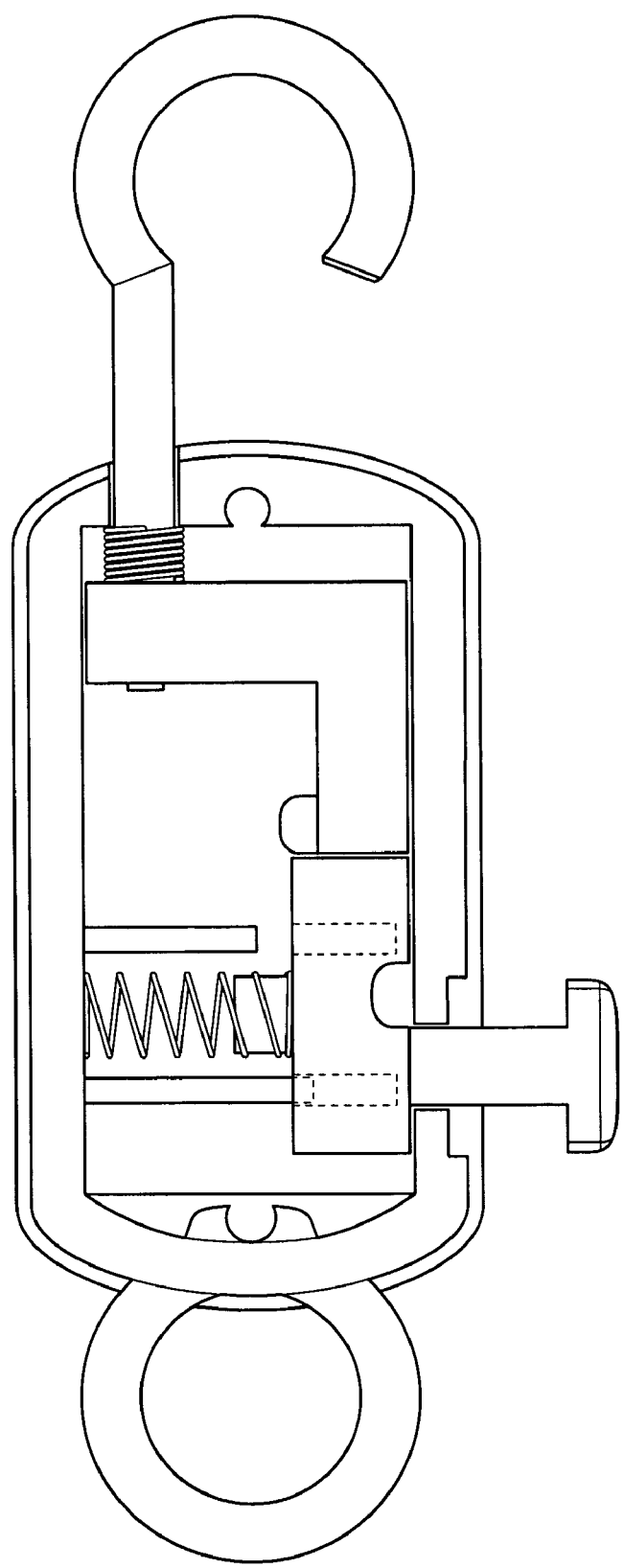
FIG. 7 is a cross-sectional view of a clasp in its locked open position in accordance with an embodiment of the invention.

In this embodiment of the present invention, arm 65 also has a channel 85*a* and a channel 85*b*, illustrated with phantom lines in FIGS. 1 and 2. The channels are part of guides that include a rail 80*a* and a rail 80*b*. The rails 80*a* and *b* are attached to the inner surface of body 10 and are arranged generally parallel to each other and generally perpendicular to bar 65. The channels 85*a* and *b* span the width of arm 65 and line up with and move along their corresponding and rails 80*a* and *b*. The guides assists with guiding the movement of arm 65 and button 70 when force is applied to and removed from button 70. The guides also assist in lining up latch 60 with latch 55 during engagement and assists in keeping them engaged by preventing bar 65 from shifting generally in the direction denoted by arrow A. FIG. 4 shows a perspective view of the guides with components of clasp 100 removed from body 10. In particular, FIG. 4 shows rails 80a and 80b along with and channels 85a and 85b. FIGS. 6 and 7 show guides having an alternative rail and channel arrangement in accordance with an embodiment of the invention.

Also connected to bar 65 is a spring holder 75. Spring holder 75 is a hollow cylinder that is positioned at the center of bar 65 and extends perpendicularly from bar 65. Spring holder 75 is open at one end, with the opposite end being attached to bar 65. A coil spring 80 has one end inserted inside spring holder 75 while its opposite end extends outside of spring holder 75. Coil spring 80 is used to energize and hold latch 60 in latch 55, thus keeping movable connector 35 from being pulled open. Coil spring 80 has an external diameter that allows one of its ends to fit tightly within spring holder 75 (e.g., set in a cylinder). One end of coil spring 80 makes contact with spring holder 75 and the other end contacts the inner wall of body 10. There is a space between the end of spring holder 75 and the inner wall so that when button 70 is pressed, arm 65 and spring holder 75 can move in the direction denoted by arrow B and unlatch latch 60 from latch 55. The space between the end of the shaft of spring holder 75 and the inner wall is enough so that bar 65 and latch 60 can move enough to disengage latch 60 from latch 55 of bar 50. The space can be a length generally equal to or greater than the height of latch 60. This disengagement or separation of latch 60 from latch 55 allows movable connector 35 to be pulled open, which is discussed in more detail below.

Generally, clasp 100 has two moving parts: (1) movable connector 35 and bar 50; (2) button 70, spring holder 75 and bar 65, where bars 50 and 65 act as the latches. Each part has its own coil spring; coil springs 40 and 80 that move each part during the opening and closing of clasp 100. The part includes the movable connector 35 and the part includes button 70. Button 70 operates in three stages for locking clasp 100 in the open and closed positions.

As mentioned above, FIG. 1 shows clasp 100 locked in the closed position. In the closed position, the open hook of movable connector 35 is forced closed against body 10 by the resilient force of coil spring 40 applied to the inner wall and bar 50. Coil springs 40 and 80 work together to force latch 55 of bar 50 to engage latch 60 of bar 65. The engagement of latch 55 and latch 60 result in the locking of clasp 100 in the closed position. In this position clasp 100 cannot be pulled open.

FIG. 2 shows clasp 100 locked in the open position. Generally, in the open locked position, bar 50 and bar 65 are repositioned by an external push force applied to button 70, external pull force applied to movable connector 35, and the expansion force applied by coil spring 80 to bar 65 after the force on button 70 is removed. As shown in FIG. 2, bars 50 and 65 are repositioned so that end 65a of bar 65 is repositioned to line up with end portion 55b of bar 50, thus locking movable connector 35 in the open position.

To describe how the clasp gets from the locked closed position to the locked open position, we refer back to FIG. 1. To open clasp 100, button 70 is pressed which moves bar 65 in the direction denoted by arrow B. Pushing button 70 compresses spring coil 80 while disengaging latch 60 from latch 55. With latch 60 disengaged from latch 55, movable connector 35 and bar 50 can be pulled in the direction denoted by arrow A. While pulling movable connector 35, the external force applied to button 70 can be released so that coil spring 80 can expand and move block 65 into the locked open position, as shown in FIG. 2. As mentioned above, the locked open position involves bars 50 and 65 being repositioned so that end 65a of bar 65 lines up with end portion 55b of bar 50. In this position movable connector 35 can then be easily manipulated to receive an end of a chain, such as a necklace or the like, without concern for the movable connector 35 unintentionally closing.

Once a chain is hooked to movable connector 35, clasp 100 can be locked in the closed position. To lock clasp 100 in the closed position, button 70 is pressed. Pressing button 70 compresses coil spring 80 allowing bar 65 to move in the direction denoted by arrow B. Pressing button 70 repositions bar 65, allowing coil spring 40 to expand and move movable connector 35 and bar 50 in the direction denoted by arrow A. Movable connector 35 closes against body 10, thus locking the chain to clasp 100. When button 70 is released, coil spring 80 expands and button 70 and bar 65 move in the direction denoted by arrow B, resulting in latch 60 engaging latch 55 of bar 50. This engagement results in clasp 100 being locked in the closed position.

In another embodiment of the present invention, the button, bar, and spring holder can be formed integrally with each other or any combination thereof. Alternatively, the movable connector and bar can also be formed integrally with each other or any combination thereof.

In yet another embodiment, rather than coil spring 40 being disposed around the linear portion of movable connector 35, coil spring 40 is connected between bar 50 and the inner wall of body 10. Similar to coil spring 80, one end of coil spring 40 is connected to the inner wall of body 10 and the opposite end sits in a spring holder (e.g., set in a cylinder) that is connected to arm 55a of bar 50.

Figure 5:
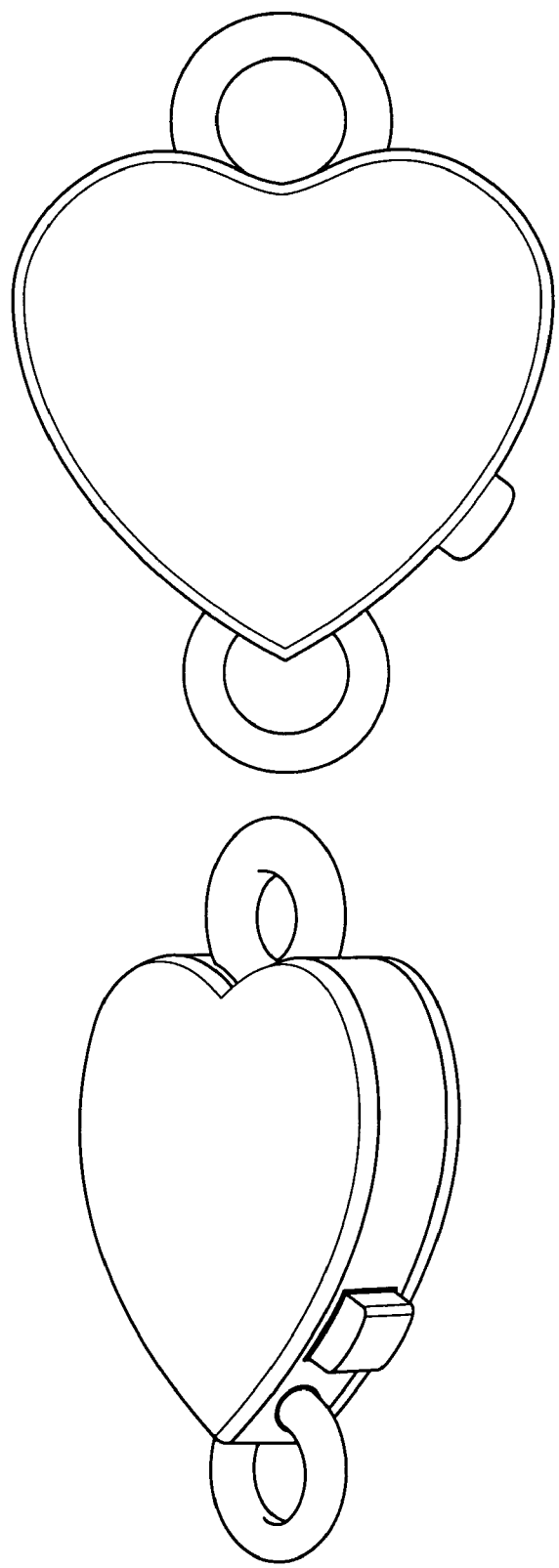
FIG. 5 shows two views of a clasp having a heart shaped body.

In another embodiment of the present invention, the invention may be embodied with different shaped bodies, such as a heart shaped body shown in FIG. 5.

In another embodiment of the present invention, spring holder 75 is a peg and coil spring 80 has a diameter greater than the diameter of the peg so that coil spring 80 can wrap around the peg, as illustrated in FIGS. 6 and 7.

Finally, in another embodiment of the present invention, latch 60 is in the approximate middle of bar 65 and latch 55 is at end 55b of bar 50 and can be positioned to directly interact, contact, and fit into latch 60, as illustrated in FIGS. 6 and 7. In this example, latch 55 is a protrusion spanning the width of bar 50 and having a general height and shape equal to the general depth and inverse shape of latch 60. Latch 60 and latch 55 act together to keep movable connector 35 locked when in the closed position. Bar 65 can move completely under bar 50 and up against the inside wall of body 10 when the clasp is in the locked open position. The end of bar 50 is notched out so it can overhang the shaft of button 70 allowing for a larger opening when movable connector 35 is opened, as shown in FIG. 8 and in FIG. 9.

What is claimed is:
1. A clasp for jewelry comprising:
   a body having a first opening, a second opening, and an internal space;
   a connector fixed to the body for linking to a chain;
   a first spring;
   a movable connector, inseparable from the body, movable to a locked closed position by the first spring and movable to a locked open position by an external force, the movable connector extends through the first opening and includes a first latch piece within the internal space of the body;
   one or more guides in the internal space; and
   a button extends through the second opening and is movable along the one or more guides, the button includes a second spring and a second latch piece that interfaces with the first latch piece, the button includes two posi- tions, in a first position the second latch piece locks with the first latch piece, in a second position the second latch piece and the first latch piece disengage and the movable connector can be moved by an external force allowing the second spring to move the second latch piece to the locked open position, wherein in the locked open position the second latch piece blocks movement of the first latch piece towards the locked closed position.

2. The clasp according to claim 1 wherein the one or more guides comprise at least one rail and at least a channel in the button that moves along the rail.

3. The clasp according to claim 1 wherein the first latch piece is L-shaped.

4. The clasp according to claim 3 wherein the first latch piece includes a groove.

5. The clasp according to claim 3 wherein the first latch piece includes a protrusion.

6. The clasp according to claim 1 wherein the second latch piece is rectangular shaped.

7. The clasp according to claim 6 wherein the second latch piece includes a protrusion.

8. The clasp according to claim 6 wherein the second latch piece includes a groove.

9. The clasp according to claim 1 wherein the first spring is coiled around an internal linear portion of the movable connector.

10. The clasp according to claim 1 wherein the first spring connects to the first latch piece and to a wall within the internal space of the body.

11. The clasp according to claim 1 wherein the second spring connects to the button and to a wall within the internal space of the body.

12. The clasp according to claim 1 wherein the second spring wraps around a peg connected to the button and connects to a wall within the internal space of the body.

13. The clasp according to claim 1 wherein the body has an external shape like a heart.

14. A clasp for jewelry comprising:
a body having a first opening, a second opening, and an internal space;
a connector fixed to the body for linking to a chain;
a first spring
a movable connector, inseparable from the body, movable to a locked closed position by the first spring and movable to a locked open position by an external force, the movable connector extends through the first opening and includes a first latch piece within the internal space of the body;
one or more guides in the internal space; and
a button extends through the second opening and includes a second latch piece movable along the one or more guides that locks with the first latch piece in the locked closed position and in the locked open position, the second latch piece having a first position, a second position and a third position, the first position is held in the locked closed position by a second spring that forces the second latch piece to interface with the first latch piece, the second position causes the first and second latch pieces to disengage allowing the movable connector to be moved by the external force to the open position, and the third position, held by force from the second spring, causes the second latch piece and the first latch piece to engage resulting in the locked open position.

15. The clasp according to claim 14 wherein the second latch piece is returned to the first position by removing the external force applied to the movable connector and by pressing and releasing the button.

16. The clasp according to claim 14 wherein the one or more guides comprise at least one rail and at least a channel in the button that moves along the rail.

17. The clasp according to claim 14 wherein the first latch piece has a latch area shaped as a groove and the second latch piece has a protrusion that interfaces with the groove to lock the movable connector in the locked closed position.

18. The clasp according to claim 14 wherein the first latch piece has a latch area shaped as a protrusion and the second latch piece has a groove that interfaces with the protrusion to lock the movable connector in the locked closed position.

19. The clasp according to claim 14 wherein the first latch piece is L-shaped.

20. The clasp according to claim 19 wherein the first latch piece includes a groove.

21. The clasp according to claim 19 wherein the first latch piece includes a protrusion.

22. The clasp according to claim 14 wherein the second latch piece is rectangular shaped.

23. The clasp according to claim 22 wherein the second latch piece includes a protrusion.

24. The clasp according to claim 22 wherein the second latch piece includes a groove.

25. The clasp according to claim 14 wherein the first spring is coiled around an internal linear portion of the movable connector.

26. The clasp according to claim 14 wherein the first spring connects to the first latch piece and to a wall within the internal space of the body.

27. The clasp according to claim 14 wherein the second spring connects to the button and to a wall within the internal space of the body.

28. The clasp according to claim 14 wherein the second spring wraps around a peg connected to the button and connects to a wall within the internal space of the body.

29. The clasp according to claim 14 wherein the body has an external shape like a heart.

30. A clasp for jewelry comprising:
a body having an internal space, a first opening and a second opening generally perpendicular to each other;
a connector fixed to the body for linking to a chain;
a first spring;
a movable connector, inseparable from the body, movable to a locked closed position by the first spring and movable to a locked open position by an external force, the movable connector extends through the first opening and includes a first piece within the internal space of the body, the first piece is L-shaped and includes a first latch;
one or more guides in the internal space; and
a button having a shaft that extends through the second opening, the shaft of the button connected to a second piece perpendicular to the button and including a second spring, the second piece interfaces with the one or more guides and includes a second latch for interfacing with the first latch, the button includes a first position and a second position held in place by the second spring, in the first position the second latch interfaces with the first latch locking the movable connector in the closed position, and in the second position the second latch and the first latch disengage, allowing the movable connector to be moved by an external force to the open locked position, wherein in the locked open position the second latch piece blocks movement of the first latch piece towards the locked closed position.

31. The clasp according to claim 30 wherein the one or more guides comprise at least one rail and at least a channel in the second piece.

32. The clasp according to claim 30 wherein the first latch is an area shaped as a groove and the second latch has a protrusion that interfaces with the groove.

33. The clasp according to claim 30 wherein the first latch is an area shaped as a protrusion and the second latch has a groove that interfaces with the protrusion.

34. The clasp according to claim 30 wherein the first spring is coiled around an internal linear portion of the movable connector.

35. The clasp according to claim 30 wherein the first spring connects to the first piece and to a wall within the internal space of the body.

36. The clasp according to claim 30 wherein the body has an external shape like a heart.

37. The clasp according to claim 30 wherein the first piece has a notched out end that overhangs the shaft of the button when the movable connector is in the closed position.

38. A clasp for jewelry comprising:
- a body having an internal space, a first opening and a second opening generally perpendicular to each other;
- a connector fixed to the body for linking to a chain;
- a movable connector inseparable from the body, extends through the first opening;
- an L-shaped piece connected to the movable connector located within the internal space of the body and including a first latch;
- a first spring between the L-shaped piece and an internal wall of the body, the first spring in a position to energize the movable connector and the L-shaped piece to a locked closed position and resist a locked open position;
- one or more guides in the internal space;
- a button extends through the second opening;
- a second piece that interfaces with the one or more guides and is connected to the button at a angle perpendicular to the button, the second piece includes a second latch for interfacing with the first latch when the movable connector is in the locked closed position; and
- a second spring between the second piece and an internal wall of the body, the second spring positioned to energize the second piece in a direction to interface the second latch with the first latch in the locked closed position, and the second spring energizing the second piece further in the direction to place an end of the second piece in contact with the L-shaped piece in the locked open position, wherein the contact between the end of the second piece and the L-shaped piece prevents movement of the L-shaped piece towards the locked closed position.

* * * * *